April 1, 1969     C. B. ASKE, JR., ET AL     3,436,123
VEHICLE WHEEL TRIM

Filed April 18, 1967

INVENTORS
CHARLES B. ASKE, JR
& EDWARD L. WOOD
BY

ATTORNEY

INVENTORS
CHARLES B. ASKE, JR.
& EDWARD L. WOOD
BY
*Everett F. Wright*
ATTORNEY

United States Patent Office 3,436,123
Patented Apr. 1, 1969

3,436,123
VEHICLE WHEEL TRIM
Charles B. Aske, Jr., Birmingham, Mich., and Edward L. Wood, Gig Harbor, Wash., assignors to Gar Wood Industries, Inc., a corporation of Michigan
Filed Apr. 18, 1967, Ser. No. 631,712
Int. Cl. B60b 7/00; B60r 13/00, 19/00
U.S. Cl. 301—37　　　　　　　　　　　　　　3 Claims

ABSTRACT OF THE DISCLOSURE

A vehicle wheel trim assembly preferably consisting of a reflective metal wheel cover element including means for securing the same to a vehicle wheel, and a transparent ornamental dome shape plastic bubble type disc element of a selected color disposed over a substantial central portion of said wheel cover element providing a jewel-like effect, the said plastic disc bearing at its outer periphery against the wheel cover with its central portion spaced therefrom, and means securing said ornamental bubble type disc to said metal wheel cover at the central portions thereof including means permitting the flexing of said wheel cover and said ornamental bubble type disc with respect to each other whereby to permit the vehicle wheel and the wheel trim assembly elements to weave, deflect, expand and contract with respect to each other responsive to severe road shocks and temperature changes, all without damage to the said bubble type ornamental disc.

---

This invention relates to improved ornamental wheel trim for modern automotive vehicle wheels.

The primary object of the invention is to provide in an improved vehicle wheel trim consisting of the combination of a highly reflective metal wheel cover element for an automotive vehicle wheel with an ornamental transparent dome shaped bubble type plastic disc element of a selected color disposed over the central portion of said wheel cover element providing a jewel-like effect, said ornamental transparent dome shaped bubble type plastic element bearing at its outer periphery against said wheel cover element and being centrally secured thereto.

Another object of the invention is to provide in an improved vehicle wheel trim of the aforesaid type, central means for assembling and securing the said ornamental dome shaped plastic disc element to the said wheel cover element which completely cushions one with respect to the other at said central securing means and permits the vehicle wheel and the wheel cover assembly to weave and deflect responsive to the usual vehicle wheel deflection and distortion occurring particularly when a motor vehicle is driven over rough roads and on sharp turns, all without damage to said ornamental dome shaped plastic disc element, the said ornamental plastic disc to wheel cover securing means further permitting expansion and contraction of said ornamental plastic disc element with respect to said metal wheel cover element without damage to said ornamental plastic disc.

A further object of the invention is to provide, in combination with said central ornamental dome shaped plastic disc to wheel cover securing means, an outer ornamental medallion replacing the medallion normally employed on the wheel cover.

Other objects of the invention will become apparent by reference to the accompanying drawings, in which.

Figure 1:
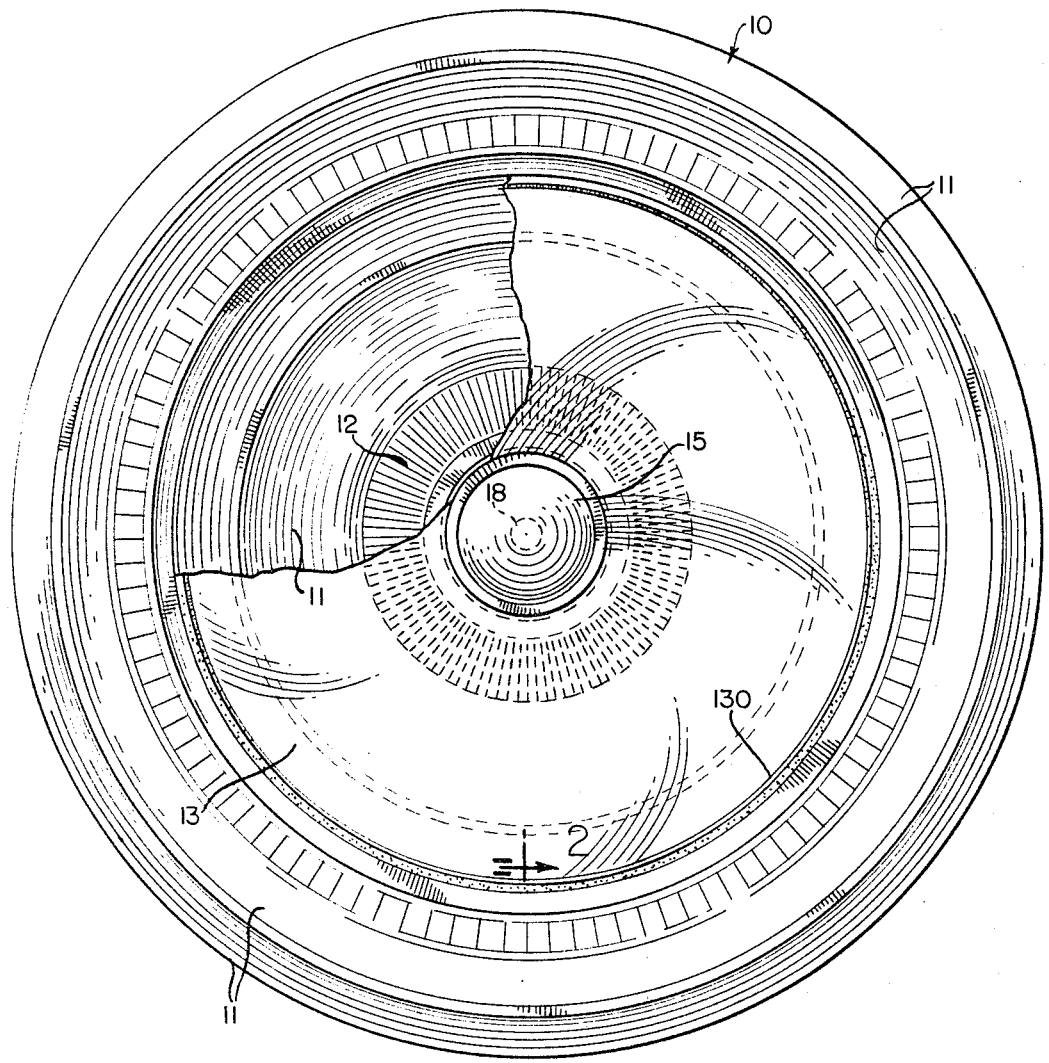
FIG. 1 is a side elevatoinal view of a vehicle wheel trim embodying the invention.

Referring now to the drawings wherein like reference characters refer to like and corresponding views, the particular embodiment of vehicle wheel trim 10 of the invention disclosed herein for illustrative purposes consists of a more or less conventional wheel cover element 11 formed of stainless steel or the like preferably having a central hub portion 12 onto which is concentrically mounted a preferably plastic transparent dome type ornamental disc element 13 of a selected color. The said dome shaped ornamental disc element 13 is secured in spaced relationship to said hub 12 of the wheel cover element 11 by resilient central securing means 14 having as an element thereof a preferably metal medallion or other ornamental piece 15 overlying the central portion of the said wheel cover element. The said medallion 15 is preferably of sufficient size to substantially obscure from view that portion of the said central securing means 14 located between the transparent dome type ornamental disc element 13 and the hub 12 of the wheel cover element 11.

The said wheel cover element 11 has an annular generally axially and outwardly facing annular abutment 110 formed therein to receive in bearing relationship the outer periphery of the said dome shaped ornamental disc element 13 when assembled on the said wheel cover element 11. The said central securing means 14 and the said abutment 110 of the wheel cover element 11 function to maintain the said dome shaped ornamental disc element 13 in concentric assembled relationship with respect to the wheel cover element 11. A small rubber bead or the like 130 may be placed over the outer periphery of the dome shaped ornamental disc 13 to provide a substantially hermetically sealed air space 16 between the said dome shaped ornamental disc element 13 and the wheel cover element 11 when assembled into the wheel trim assembly 10. This construction prevents dirt, water and grime from collecting in the said air space 16 and thus eliminates cleaning between the wheel cover element 11 and the dome shaped ornamental disc element 13.

The reflective metal wheel cover element 11 may be of any more or less conventional design preferably including an ornamental central hub portion 12 and outer peripheral securing means 111 such as resilient teeth or the like for securing the wheel trim assembly 10 to a vehicle wheel preferably at the wheel rim. Obviously, any adequate means may be employed for securing the wheel trim assembly 10 to a vehicle wheel.

Figure 3:
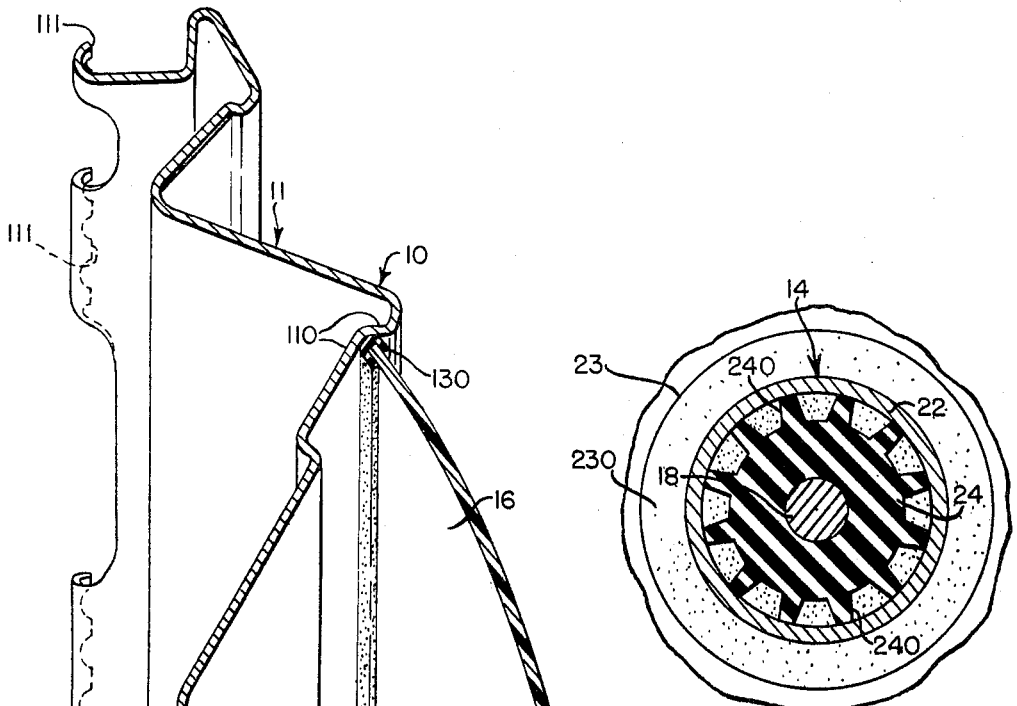
FIG. 3 is an enlarged cross sectional view taken on the line 3—3 of FIG. 2.
Figure 2:
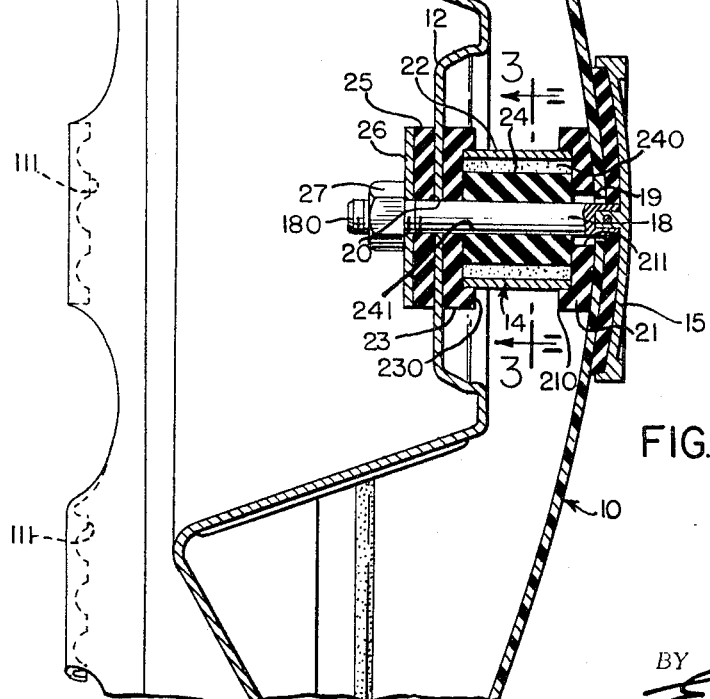
FIG. 2 is a vertical sectional view taken on the line 2—2 of FIG. 1.

Referring now particularly to FIGS. 2 and 3, the central dome shaped ornamental disc to wheel cover securing means 14 preferably consists of a medallion or other ornamental cap 15 having an axially inwardly disposed stud 18 fixed centrally thereto, the said stud 18 extending in spaced relationship through a central aperture 19 in the dome shaped ornamental plastic disc 13 and through an aperture 20 in the center or central hub portion 12 of the wheel cover element 11.

Between the said central dome shaped ornamental disc 13 and the wheel cover element 11 and telescoped over the said stud 18 is an annular resilient washer 21, an annular spacer thimble 22, and a second annular resilient washer 23. Each of the annular washers 21 and 23 is provided with an outer annular shoulder 210 and 230 respectively preferably employed to assure concentric assembly of the said thimble 22 and washers 21 and 23 as best illustrated in FIG. 2. The central aperture 211 of the annular washer 21 is somewhat larger than the diameter of the said stud 18 so as not to restrict the resiliency of the resilient rubber sleeve 24 within the thimble 22. Within the thimble 22 is a resilient rubber central sleeve 24 preferably formed with resilient circumferentially spaced longitudinally disposed teeth 240 therearound. The said central sleeve 24 is centrally apertured at 241 to telescope neatly over the stud 18. On the axially inner side of the central or hub portion 12 of the wheel cover element 11 is an annular rubber washer 25 and a metal washer 26 which are telescoped in that order over the axially inwardly extending threaded end portion 180 of the stud 18, and a nut 27 is threaded on the end of the said stud 18 which is employed to draw firmly together the several hereinbefore described elements of the central securing means 14 in their relationship shown in FIG. 2 which resiliently and yet firmly holds the said colored ornamental transparent dome shaped bubble type plastic disc element 13 in assembled relationship on the wheel cover element 11 with the outer periphery of said dome shaped ornamental disc 10 in firm contact with the annular abutment 110 of said wheel cover element 11.

The foregoing construction assures concentricity of the vehicle wheel trim 10 consisting of the assembly of the ornamental transparent dome shaped bubble type colored plastic disc 10 on a relatively conventional stainless steel or other reflective wheel cover element 11 to provide a jewel-like effect. The several elements of the central securing means provide a firm rattle-proof mounting of the said dome shaped ornamental disc element 10 concentrically on the wheel cover element 11, and at the same time permitting the said wheel cover element 11 and the dome shaped ornamental disc to weave, deflect, expand or contract with respect to each other and the vehicle wheel responsive to severe road shocks and the driving of a vehicle equipped with vehicle wheel trim of the invention around relatively sharp turns and responsive to temperature changes, all without damage to or fracture of the said ornamental transparent dome shaped bubble type colored plastic disc element.

We claim:
1. A vehicle wheel trim for motor vehicle wheels comprising, in combination,
  a vehicle wheel cover element of reflective metal or the like,
  means securing said wheel cover element to a vehicle wheel,
  a transparent ornamental generally dome shaped plastic bubble type disc element of a selected color disposed over said wheel cover element,
  means resiliently securing said ornamental dome shaped plastic disc element to said vehicle wheel cover at the center thereof with the outer periphery only of said ornamental dome shaped disc element in contact with said wheel cover element,
  said resilient securing means permitting flexing and expansion and contraction of said wheel cover element, and said ornamental dome shaped plastic disc element with respect to the vehicle wheel and each other responsive to severe road shocks, flexing of the vehicle wheel and temperature changes without damage to said ornamental dome shaped plastic disc element,
  the said wheel cover element being provided with an annular abutment therein formed to receive in bearing relationship the outer periphery of said ornamental dome shaped plastic disc element, and
  a relatively soft resilient bead disposed over the outer periphery of said ornamental dome shaped plastic disc element whereby to substantially hermetically seal the air space between the said dome shaped ornamental disc element and said wheel cover element.

2. A vehicle wheel trim for motor vehicle wheels as claimed in claim 1 wherein the said means resiliently securing said plastic disc element to said wheel cover element includes
  a central stud having a head of substantial area disposed through a central aperture in said ornamental dome shaped disc element substantially greater in diameter than said central stud provided in said plastic disc element and extending through a central aperture in said wheel cover element substantially the same size as the diameter of said central stud,
  an annular spacer thimble having a centrally apertured resilient rubber sleeve therein telescoped neatly over said central stud and disposed between said plastic disc element and said wheel cover element,
  a resilient washer disposed between each of said stud head and said plastic disc element, said plastic disc element and said thimble, and said thimble and said wheel cover element,
  the said resilient washer between said plastic disc element and said thimble having its central aperture substantially greater in diameter than said central stud,
  a securing nut threaded on the inner end of said stud including a resilient and a metal washer disposed between said wheel cover element and said securing nut,
  said resilient washers at the ends of said spacer thimble being somewhat more resilient than the other washers and formed at their outer peripheral portions to center said spacer sleeve with respect to said stud, and
  said resilient rubber sleeve in said spacer thimble being of greater resiliency than said resilient washers between said spacer thimble and said wheel cover element.

3. A vehicle trim for motor vehicle wheels as claimed in claim 2 wherein
  the resilient rubber sleeve in said spacer thimble is formed with circumferentially spaced longitudinally disposed teeth assuring a minimum of restriction of relative deflection, expansion and contraction of said plastic disc element and said wheel cover element with respect to each other.

References Cited

UNITED STATES PATENTS

| 2,593,274 | 4/1952 | Dandwrand | 301—108 |
| 2,650,862 | 9/1953 | Lyon. | |
| 3,155,430 | 11/1964 | Schindler. | |
| 3,178,231 | 4/1965 | Hezler. | |
| 3,333,900 | 8/1967 | Aske. | |

FOREIGN PATENTS

| 192,772 | 11/1957 | Austria. |
| 1,028,861 | 5/1966 | Great Britain. |

RICHARD J. JOHNSON, *Primary Examiner.*